(12) United States Patent
Radmilac et al.

(10) Patent No.: US 8,719,831 B2
(45) Date of Patent: May 6, 2014

(54) DYNAMICALLY CHANGE ALLOCATION OF RESOURCES TO SCHEDULERS BASED ON FEEDBACK AND POLICIES FROM THE SCHEDULERS AND AVAILABILITY OF THE RESOURCES

(75) Inventors: Marko Radmilac, Bellevue, WA (US); Genevieve Fernandes, Redmond, WA (US); Paul Ringseth, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 679 days.

(21) Appl. No.: 12/487,091

(22) Filed: Jun. 18, 2009

(65) Prior Publication Data

US 2010/0325637 A1   Dec. 23, 2010

(51) Int. Cl.
*G06F 9/46* (2006.01)

(52) U.S. Cl.
USPC ............ 718/104; 718/100; 718/102; 718/105

(58) Field of Classification Search
None
See application file for complete search history.

(56) References Cited

U.S. PATENT DOCUMENTS

| | | | |
|---|---|---|---|
| 7,284,238 B2 | 10/2007 | Inagaki et al. | |
| 7,418,585 B2 | 8/2008 | Kissell | |
| 7,448,037 B2 | 11/2008 | Arimilli et al. | |
| 7,451,450 B2 | 11/2008 | Sankaranarayan et al. | |
| 7,474,991 B2 | 1/2009 | DeWitt, Jr. et al. | |
| 7,644,162 B1 * | 1/2010 | Zhu et al. | 709/226 |
| 7,823,154 B2 * | 10/2010 | Wang et al. | 718/102 |
| 8,015,564 B1 * | 9/2011 | Beyer et al. | 718/100 |
| 2003/0191795 A1 * | 10/2003 | Bernardin et al. | 709/105 |
| 2004/0268314 A1 | 12/2004 | Kollman et al. | |
| 2005/0172291 A1 * | 8/2005 | Das et al. | 718/104 |
| 2005/0240935 A1 * | 10/2005 | Ramanathan | 718/105 |
| 2006/0031843 A1 * | 2/2006 | Romero | 718/104 |
| 2006/0117317 A1 * | 6/2006 | Crawford et al. | 718/104 |
| 2006/0221086 A1 | 10/2006 | Diard | |
| 2006/0288348 A1 * | 12/2006 | Kawamoto et al. | 718/105 |
| 2007/0033591 A1 * | 2/2007 | Kline et al. | 718/102 |
| 2007/0083868 A1 * | 4/2007 | Sankaranarayan et al. | 718/104 |
| 2007/0234365 A1 | 10/2007 | Savit | |
| 2007/0294697 A1 * | 12/2007 | Theimer et al. | 718/102 |
| 2008/0034108 A1 * | 2/2008 | Chapweske | 709/234 |
| 2008/0077927 A1 * | 3/2008 | Armstrong et al. | 718/104 |

(Continued)

OTHER PUBLICATIONS

Steere, et al., "A Feedback-driven Proportion Allocator for Real-Rate Scheduling", Retrieved at <<http://www.usenix.org/events/osdi99/full_papers/steere/steere.pdf>>, Proceedings of the 3rd Symposium on Operating Systems Design and Implementation, Feb. 1999, pp. 15.

(Continued)

*Primary Examiner* — Meng An
*Assistant Examiner* — Tammy Lee
(74) *Attorney, Agent, or Firm* — Kevin Sullivan; Kate Drakos; Micky Minhas

(57) ABSTRACT

A resource manager manages processing and other resources of schedulers of one or more processes executing on one or more computer systems. For each scheduler, the resource manager determines an initial allocation of resources based on the policy of the scheduler, the availability of resources, and the policies of other schedulers. The resource manager receives feedback from the schedulers and dynamically changes the allocation of resources of schedulers based on the feedback. The resource manager determines if changes improved the performance of schedulers and commits or rolls back the changes based on the determination.

20 Claims, 10 Drawing Sheets

(56) References Cited

U.S. PATENT DOCUMENTS

| | | | |
|---|---|---|---|
| 2008/0086731 A1* | 4/2008 | Trossman et al. | 718/100 |
| 2008/0098207 A1 | 4/2008 | Reid et al. | |
| 2008/0134191 A1* | 6/2008 | Warrier et al. | 718/104 |
| 2008/0163366 A1 | 7/2008 | Chinya et al. | |
| 2008/0172672 A1* | 7/2008 | Logan et al. | 718/104 |
| 2008/0172673 A1 | 7/2008 | Naik | |
| 2008/0313639 A1* | 12/2008 | Kumar et al. | 718/104 |
| 2009/0031312 A1* | 1/2009 | Mausolf et al. | 718/102 |
| 2009/0055831 A1* | 2/2009 | Bauman et al. | 718/104 |
| 2009/0138887 A1* | 5/2009 | Uehara et al. | 718/104 |
| 2009/0276783 A1* | 11/2009 | Johnson et al. | 718/104 |
| 2010/0005468 A1* | 1/2010 | Chang et al. | 718/102 |
| 2010/0218192 A1* | 8/2010 | Dunn | 718/104 |
| 2011/0191783 A1* | 8/2011 | Le Moal | 718/105 |

OTHER PUBLICATIONS

"CPU Scheduling", Retrieved at <<cs.uic.edu/~i385/CourseNotes/5_CPU_Scheduling.html>>, Apr. 2, 2009, pp. 1-19.

Soundararajan, et al., "Dynamic Resource Allocation for Database Servers Running on Virtual Storage", Retrieved at <<usenix.org/events/fast/tech/full_papers/soundararajan/soundararajan_html/index.html>>, Apr. 2, 2009, pp. 19.

"Dynamic Feedback Load Balancing Scheduling", Retrieved at linuxvirtualserver.org/wiki/Dynamic_Feedback_Load_Balancing_Scheduling>>, Apr. 2, 2009, pp. 5.

He, et al., "Feedback Control-based Dynamic Resource Management in Distributed Real-Time Systems", Retrieved at users.cs.umn.edu/~tianhe/Papers/DFCS-JSS.pdf>>, Jul. 7, 2006, pp. 1-20.

Lin, et al., "Double-loop Feedback-based Scheduling Approach for Distributed Real-Time Systems", Retrieved at eprints.kfupm.edu.sa/35839/1/35839.pdf>>, in HiPC 2003, pp. 10.

"Monitoring and Improving Application Performance", Retrieved at cs.uvm.edu/oracle9doc/server.901/a87504/ch2.htm>>, Release 1 (9.0.1), Part No. A87504-02, pp. 13.

Waddington, et al."Dynamic Analysis and Profiling of Multi-threaded Systems", Retrieved at cs.wustl.edu/~schmidt/PDF/DSIS_Chapter_Waddington.pdf>>, pp. 32.

"Lauterbach TRACE32 Debugger Shows ThreadX V5 Performance and Trace Data to Speed Development", Retrieved at embedded-computing.com/news/db/?5435>>, pp. 3.

"Trace", Retrieved at cisco.com/en/US/products/sw/custcosw/ps1846/products_administration_guide_chapter09186a00800dd87d.html>>, pp. 7.

"Intel Trace Analyzer and Collector 7.2", Retrieved at intel.com/cd/00/00/40/73/407324_407324.pdf>>, pp. 2.

Klues, et al., "Dynamic Resource Management in a Static Network Operating System", Retrieved at cse.seas.wustl.edu/Research/FileDownload.asp?599>>, Department of Computer Science & Engineering—Washington University in St. Louis, Oct. 9, 2006, pp. 15.

Barreto, et al., "Programming OS Schedulers with Domain-Specific Languages and Aspects: New Approaches for OS Kernel Engineering", Retrieved at emn.fr/x-info/bossa/acp4is-scheduling.pdf>>, International Workshop on Aspects, Components, and Patterns for Infrastructure Software at AOSD, 2002, pp. 6.

HP-UX Processor Sets, Retrieved at docs.hp.com/en/5185-4322/5185-4322.pdf>>, A Technical White Paper, Nov. 2001, pp. 1-26.

Schatz, et al., "Model-Based Software and Systems Development", Retrieved at informatik.tu-muenchen.de/~schaetz/papers/ModelBased.pdf>>, White Paper, 2008, pp. 3.

Cai, et al., "The Gridkit Distributed Resource Management Framework", Retrieved at comp.lancs.ac.uk/~geoff/Publications/EGRID05.pdf>>, Lecture notes in computer science, vol. 3470, 2005, pp. 11.

* cited by examiner

DYNAMICALLY CHANGE ALLOCATION OF RESOURCES TO SCHEDULERS BASED ON FEEDBACK AND POLICIES FROM THE SCHEDULERS AND AVAILABILITY OF THE RESOURCES

BACKGROUND

Processes executed in a computer system often have tasks with different processing demands and priorities. In order to operate as desired, a process may expend significant overhead to ensure that suitable resources are allocated to tasks based on the demands and priorities of the tasks. This overhead may include the use of one or more schedulers that schedule tasks of the process for execution in the computer system. The execution of tasks with schedulers may vary based on the processing capabilities and/or processing demands of the computer system at any given time. As a result, resource allocations to schedulers may not be optimal for some processing conditions.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

A resource manager manages processing and other resources of schedulers of one or more processes executing on one or more computer systems. For each scheduler, the resource manager determines an initial allocation of resources based on the policy of the scheduler, the availability of resources, and the policies of other schedulers. The resource manager receives feedback from the schedulers and dynamically changes the allocation of resources of schedulers based on the feedback. The resource manager determines if changes improved the performance of schedulers and commits or rolls back the changes based on the determination.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
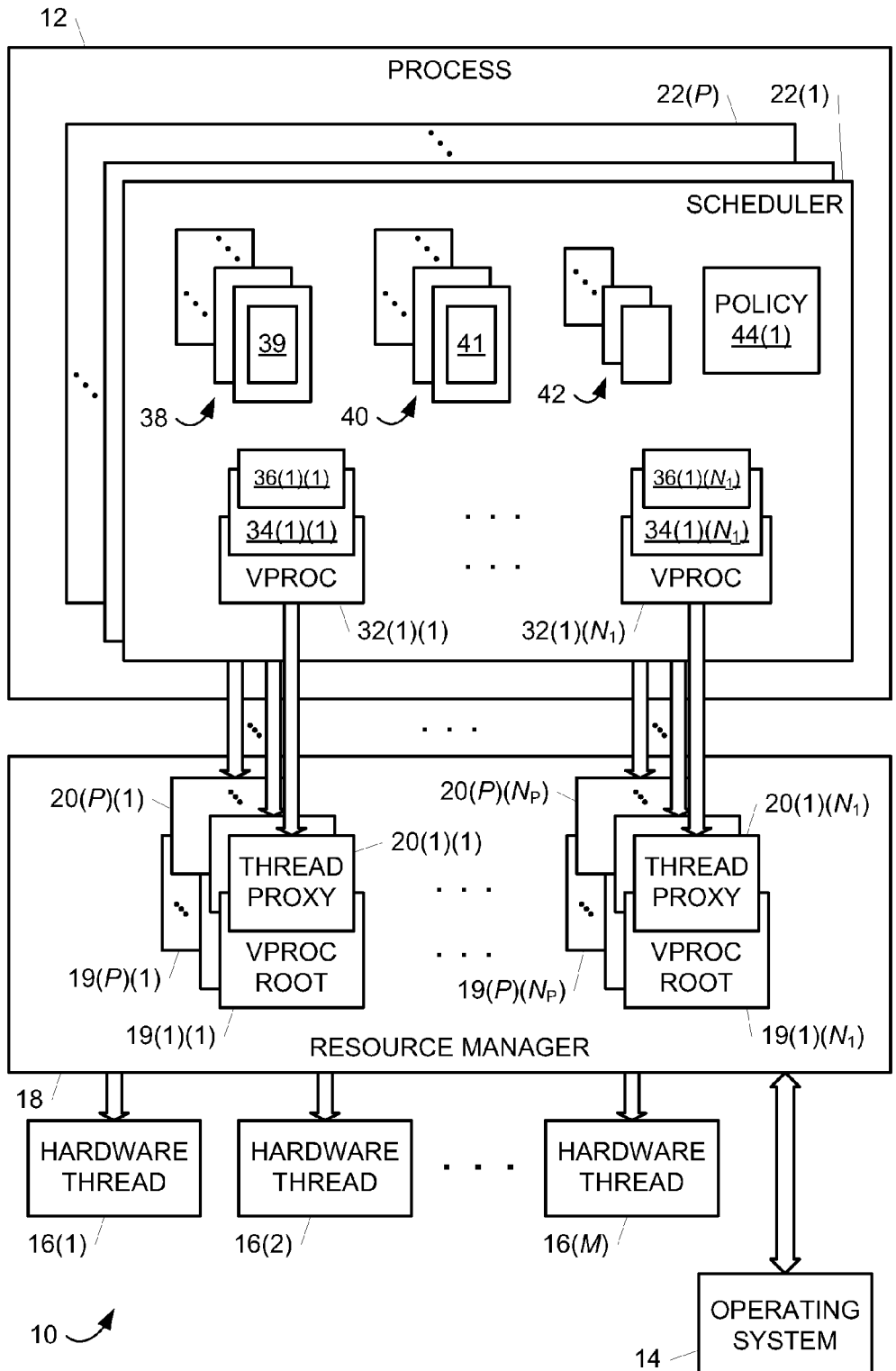
FIG. 1 is a block diagram illustrating an embodiment of a set of schedulers in a process in a runtime environment.

FIG. 1 is a block diagram illustrating an embodiment of a set of schedulers 22(1)-22(P) in a process 12 in a runtime environment 10 where P is an integer that is greater than or equal to one and denotes the Pth scheduler 22(P). Each scheduler 22 is configured to schedule tasks for execution by processing resources using execution contexts.

Runtime environment 10 represents a runtime mode of operation in a computer system, such as a computer system 100 shown in FIG. 11 and described in additional detail below, where the computer system is executing instructions. The computer system generates runtime environment 10 from a runtime platform such as a runtime platform 122 shown in FIG. 11 and described in additional detail below.

Runtime environment 10 includes an least one invoked process 12, an operating system (OS) 14, a set of hardware threads 16(1)-16(M), where M is an integer that is greater than or equal to one and denotes the Mth hardware thread 16(M), and a resource manager 18. Runtime environment 10 allows tasks from process 12 to be executed, along with tasks from any other processes (e.g., additional processes 12 shown in FIG. 10) that co-exist with process 12, using OS 14, resource manager 18, and hardware threads 16(1)-16(M). Runtime environment 10 operates in conjunction with OS 14 and/or resource manager 18 to allow process 12 to obtain processing and other resources of the computer system (e.g., hardware threads 16(1)-16(M), execution contexts, memory, and/or network bandwidth).

Runtime environment 10 includes a scheduler function that generates each scheduler 22. In one embodiment, the scheduler function is implemented as a scheduler application programming interface (API). In other embodiments, the scheduler function may be implemented using other suitable programming constructs. When invoked, the scheduler function creates a scheduler 22 in process 12 where the scheduler 22 operates to schedule tasks of process 12 for execution by one or more hardware threads 16(1)-16(M). Runtime environment 10 may exploit fine grained concurrency that application or library developers express in their programs (e.g., process 12) using accompanying tools that are aware of the facilities that the scheduler function provides.

Process 12 includes an allocation of processing and other resources that host one or more execution contexts (viz., threads, fibers (i.e., lightweight threads), or child processes). Process 12 obtains access to the processing and other resources in the computer system such as hardware threads 16(1)-16(M), execution contexts, memory, and/or network bandwidth from OS 14 and/or resource manager 18. Process 12 causes tasks to be executed using the processing and other resources. In the embodiment of FIG. 1, the processing resources include virtual processors 32(1)-32(N) where N is an integer greater than or equal to two and denotes the Nth virtual processor 32(N).

Process 12 generates work in tasks of variable length where each task is associated with an execution context in a scheduler 22. More than one task may be associated with a given execution context. Each task includes a sequence of instructions that perform a unit of work when executed by the computer system. Each execution context forms a thread, fibre (i.e., a lightweight thread), or analogous OS concept such as child process that executes associated tasks on allocated processing resources. Each execution context includes program state and machine state information. Execution contexts may terminate when there are no more tasks left to execute. For each task, runtime environment 10 and/or process 12 either assign the task to a scheduler 22 to be scheduled for execution or otherwise cause the task to be executed without using a scheduler 22.

Process 12 may be configured to operate in one or more computer systems based on any suitable execution model, such as a stack model or an interpreter model, and may represent any suitable type of code, such as an application, a library function, or an operating system service. Process 12 has a program state and machine state associated with a set of allocated resources that include a defined memory address space. Process 12 executes autonomously or substantially autonomously from any co-existing processes in runtime environment 10. Accordingly, process 12 does not adversely alter the program state of co-existing processes or the machine state of any resources allocated to co-existing processes. Similarly, co-existing processes do not adversely alter the program state of process 12 or the machine state of any resources allocated to process 12.

OS 14 manages processing and other resources of the computer system and provides a set of functions that allow process 12 and other processes in the computer system to access and use the components. In addition, OS 14 offers execution contexts to each scheduler 22 and process 12 and allocates memory from a memory system, such as a memory system 104 shown in FIG. 11 and described in additional detail below, to each scheduler 22 and process 12. OS 14 may allocate memory from the memory system in any suitable fixed or variable sizes (e.g., pages of 4 kilobytes (KB) to 19 KB).

Hardware threads 16 reside in execution cores of a set or one or more processor packages (e.g., processor packages 102 shown in FIG. 11 and described in additional detail below) of the computer system. Each hardware thread 16 is configured to execute instructions independently or substantially independently from the other execution cores and includes a machine state. Hardware threads 16 may be included in a single processor package or may be distributed across multiple processor packages. Each execution core in a processor package may include one or more hardware threads 16.

Resource manager 18 allocates processing resources to process 12 by assigning one or more hardware threads 16 to process 12. Resource manager 18 creates a set of virtual processor roots 19 and a set of thread proxies 20 for each scheduler 22. Each virtual processor root 19 manages a corresponding virtual processor 32 in a scheduler 22, forms an abstraction of a hardware thread 16, and executes a corresponding thread proxy 20. Each thread proxy 20 forms an abstraction of an execution context from OS 14 and executes a set of execution contexts of a scheduler 22 on a corresponding virtual processor root 19. The execution contexts of a scheduler 22 execute on thread proxies 20 which in turn execute on execution contexts from OS 14 on hardware threads 16. Resource manager 18 exists separately from OS 14 in the embodiment of FIG. 1. In other embodiments, resource manager 18 or some or all of the functions thereof may be included in OS 14.

Process 12 implicitly or explicitly causes each scheduler 22 to be created via the scheduler function provided by runtime environment 10. An instance of scheduler 22 may be implicitly created when process 12 uses APIs available in the computer system or programming language features. In response to the API or programming language features, runtime environment 10 creates a scheduler 22 with a default policy 44. To explicitly create a scheduler 22, process 12 may invoke the scheduler function provided by runtime environment 10 and specifies a policy 44 for the scheduler 22.

Each scheduler 22 interacts with OS 14 and resource manager 18 to negotiate processing and other resources of the computer system in a manner that is transparent to process 12. OS 14 and/or resource manager 18 initially allocates memory to each scheduler 22 in response to requests from one or more memory allocators (not shown) in each scheduler 22 and may dynamically adjust the memory allocations as described below. OS 14 and/or resource manager 18 also initially allocates hardware threads 16, execution contexts, and/or network bandwidth to each scheduler 22 based on supply and demand and any policies 44 of each scheduler 22 may dynamically adjust these resources as described below.

In the embodiment shown in FIG. 1, each scheduler 22 manages the processing resources by creating virtual processors 32 that form an abstraction of underlying virtual processor roots 19 and hardware threads 16. Resource manager 18 maps the virtual processors 32 onto virtual processor roots 19. Resource manager 18 multiplexes virtual processor roots 19 onto hardware threads 16 by mapping each virtual processor root 19 to a hardware thread 16. Resource manager 18 may map more than one virtual processor root 19 onto a particular hardware thread 16 but maps only one hardware thread 16 to each virtual processor root 19. In other embodiments, resource manager 18 manages processing resources in other suitable ways to cause instructions of process 12 to be executed by hardware threads 16.

Prior to executing tasks, each scheduler 22 obtains execution contexts 34 and 38 from runtime environment 10, resource manager 18, and/or OS 14. Available virtual processors 32 locate and execute execution contexts 34 and 38 to begin executing tasks. The set of execution contexts in each scheduler 22 includes a set of execution contexts 34(1)-34(N) with respective, associated tasks 36(1)-36(N) that are being executed by respective virtual processors 32(1)-32(N), a set of zero or more runnable execution contexts 38, and a set of zero or more blocked (i.e., wait-dependent) execution contexts 40. Each execution context 34, 38 and 40 includes state information that indicates whether an execution context 34, 38 and 40 is executing, runnable (e.g., in response to becoming unblocked or added to scheduler 22), or blocked. Execution contexts 34 that are executing have been attached to a virtual processor 32 and are currently executing. Execution contexts 38 that are runnable include an associated task 39 and are ready to be executed by an available virtual processor 32. Execution contexts 40 that are blocked include an associated task 41 and are waiting for data, a message, or an event that is being generated or will be generated by another execution context 34, 38, or 40.

Each execution context 34 executing on a virtual processor 32 may generate, in the course of its execution, additional tasks 42, which are organized in any suitable way (e.g., added to work queues (not shown in FIG. 1)). Work may be created by using either application programming interfaces (APIs) provided by runtime environment 10 or programming language features and corresponding tools in one embodiment. When processing resources are available to a scheduler 22, tasks are assigned to execution contexts 34 or 38 that execute them to completion or a blocking point (e.g. waiting for a message or a stolen child task to complete) on virtual processors 32 before picking up new tasks. An execution context 34 executing on a virtual processor 32 may also unblock other execution contexts 40 by generating data, a message, or an event that will be used by another execution context 40.

Figure 9:
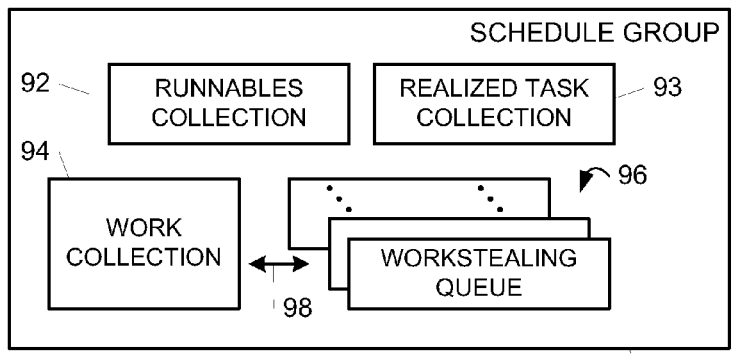
FIG. 9 is a block diagram illustrating an embodiment of a schedule group for use in a scheduler.

Each task in a scheduler 22 may be realized (e.g., realized tasks 36 and 39), which indicates that an execution context 34 or 38 has been or will be attached to the task and the task is ready to execute. Realized tasks typically include light weight tasks and agents and may be associated with an execution context 34 or 38 just before executing or in advance of execution. A task that is not realized is termed unrealized. Unrealized tasks (e.g., tasks 42) may be created as child tasks generated by the execution of parent tasks and may be generated by parallel constructs (e.g., parallel, parallel for, begin, and finish). Each scheduler 22 may be organized into a synchronized collection (e.g., a stack and/or a queue) for logically independent tasks with execution contexts (i.e., realized tasks) along with a list of workstealing queues for dependent tasks (i.e., unrealized tasks) as illustrated in the embodiment of FIG. 9 described below.

Upon completion, blocking, or other interruption (e.g., explicit yielding or forced preemption) of a task 36 associated with an execution context 34 running on a virtual processor 32, the virtual processor 32 becomes available to execute another realized task 39 or unrealized task 42. A scheduler 22 searches for a runnable execution context 38, a realized task 39, or an unrealized task 42 to attach to the available virtual processor 32 for execution in any suitable way. For example, a scheduler 22 may first search for a runnable execution context 38 to execute before searching for a realized task 39 or an unrealized task 42 to execute. A scheduler 22 continues attaching execution contexts 38 to available virtual processors 32 for execution until all execution contexts 38 of the scheduler 22 have been executed. In other embodiments, runnable execution contexts 38 and realized tasks 39 may be merged into single concept from the perspective of schedulers 22.

Each scheduler 22 includes one or more memory allocators that cause memory to be allocated for internal data structures of scheduler 22 (not shown) and tasks 36 of execution contexts 34 executing on virtual processors 34. The memory allocators request and receive access to pages of memory from OS 14 and/or resource manager 18 and allocate objects or other suitable portions of memory from the pages to tasks 36 executing on virtual processors 32. OS 14 and/or resource manager 18 may provide pages in predefined sizes of memory such as page sizes of 4 kilobytes (KB) to 19 KB to the memory allocators.

The process of allocating resources to schedulers 22 using resource manager 18 will now be described. The initial allocation of resources will be described with reference to FIGS. 2 and 3, and the dynamic reallocation of resources using feedback will be described with reference to FIGS. 5A-5B.

The resources allocated by resource manager 18 may include processing resources (e.g., virtual processors, processors, execution cores, and/or hardware threads 16), execution context resources (e.g., execution contexts 34 which may include threads, fibers (i.e., lightweight threads), or child processes), memory resources (e.g., RAM, cache memory, NUMA nodes, memory bus bandwidth, and/or other types of local and/or global memory), and/or network resources (e.g., network bandwidth).

Resource manager 18 establishes an initial allocation of resources using policies 44 of schedulers 22, the amount of resources available for allocation, and an optimal distribution technique.

Figures 2, 4:
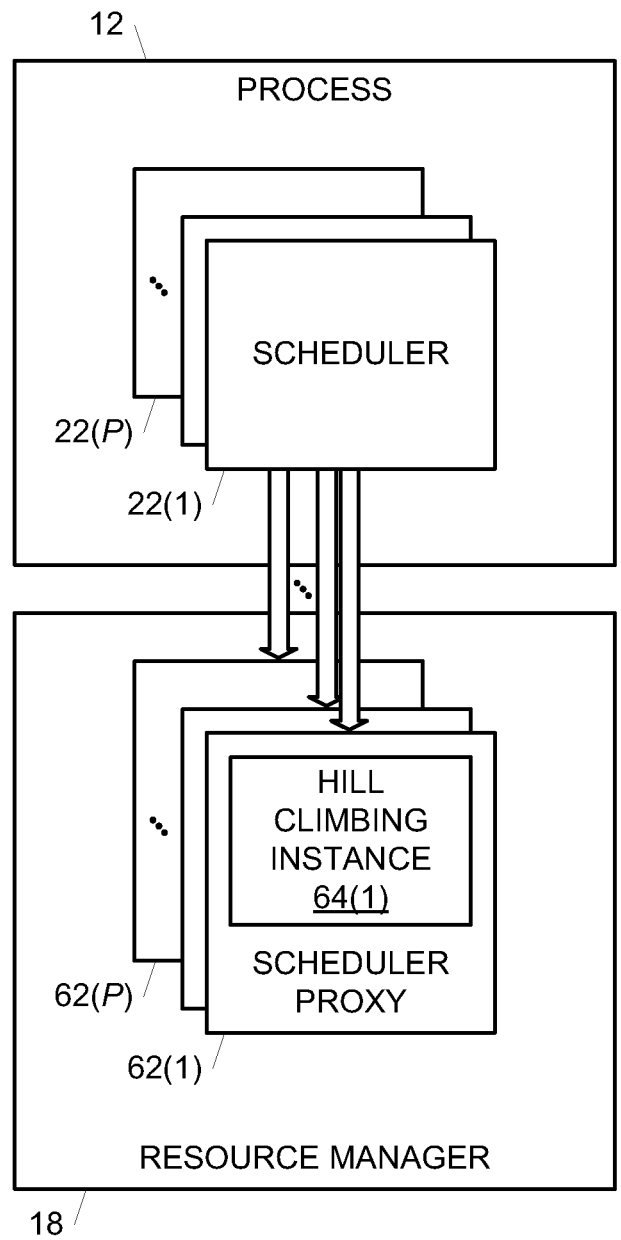
FIG. 2 is a block diagram illustrating an embodiment of a policy of a scheduler.
FIG. 4 is a block diagram illustrating an embodiment of scheduler proxies in a resource manager.

FIG. 2 is a block diagram illustrating an embodiment of a policy 44 of a scheduler 22. Policy 44 includes a priority 44A of a scheduler 22 that identifies the priority of the scheduler 22 relative to other schedulers 22 (e.g., high, normal, or low priority). Policy 44 also includes a minimum amount of resources 44B that identifies the minimum amount of desired resources for one or more types of resources for the scheduler 22 and a maximum amount of resources 44C that identifies the maximum amount of desired resources for one or more types of resources for the scheduler 22.

Figure 3:
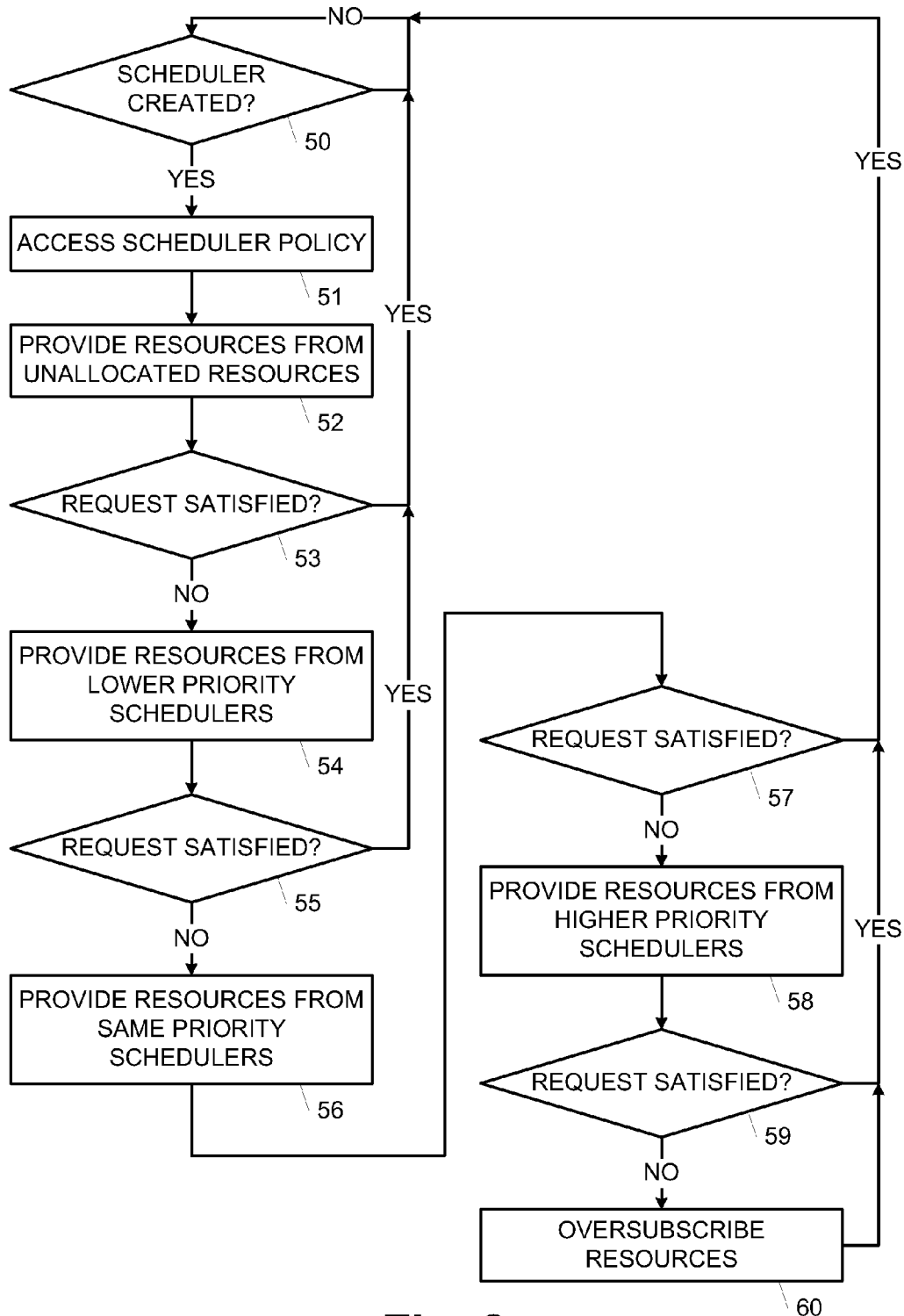
FIG. 3 is a flow chart illustrating an embodiment of a method for initially allocating resources to a scheduler.

FIG. 3 is a flow chart illustrating an embodiment of a method for initially allocating resources to a scheduler 22. Each time that a scheduler 22 is created by process 12 as indicated in a block 50, a scheduler 22 registers with resource manager 18 and requests processing and/or other resources from resource manager 18. Resource manager 18 accesses policy 44 of the newly created scheduler 22 in response to the request to identify the priority 44A and minimum and maximum amounts of resources 44B and 44C of the scheduler 22 as indicated in a block 51.

Resource manager 18 first attempts to satisfy the request for resources by providing unallocated resources (i.e., resources not currently allocated to a scheduler 22) to the newly created scheduler 22 as indicated in a block 52. Resource manager 18 provides an amount of the unallocated resources that is less than or equal to the maximum amount of resources 44C to the scheduler 22.

If the unallocated resources are not sufficient to satisfy the request (i.e., the amount of resources provided to scheduler 22 is less than the minimum amount of resources 44B specified by the scheduler 22) as indicated in a block 53, then resource manager 18 attempts to satisfy the remainder of the request using resources from lower priority schedulers 22 (i.e., schedulers 22 with a priority 44A that is lower than the priority 44A of the newly created scheduler 22) in process 12. Resource manager 18 removes any resources from the lower priority schedulers 22 that are above the minimum amount of resources 44B of each of the lower priority schedulers 22 and reallocates these resources to the newly created scheduler 22 as indicated in a block 54.

If the request remains unsatisfied as indicated in a block 55, then resource manager 18 attempts to satisfy the remainder of the request using resources from the same priority schedulers 22 (i.e., schedulers 22 with the same priority 44A as the priority 44A of the newly created scheduler 22) in process 12 as indicated in a block 56. Resource manager 18 determines the amount of resources allocated to all schedulers 22 of the same priority 44A in process 12 and determines a new allocation for each of these schedulers 22. Resource manager 18 attempts to allocate at least the minimum amount of resources to each of these schedulers 22 specified by the corresponding minimum amounts of resources 44B.

If the minimum amounts of resources of all of the schedulers 22 are met, then resource manager 18 allocates any remaining resources in a manner proportional to the corresponding maximum amounts of resources 44C of the schedulers 22. For example, if a first scheduler 22 has a maximum amount of resources 44C of four, a second scheduler 22 has a maximum amount of resources 44C of two, and resource manager 18 has five resources to allocate, then resource manager 18 provides three of the resources to the first scheduler 22 and the other two resources to the second scheduler 22.

As another example, if three schedulers 22 each have a maximum amount of resources 44C of two and resource manager 18 has four resources to allocate, then resource manager 18 applies the following technique. First, resource manager 18 divides the number of resources to allocate by the number of schedulers 22 to get a value for each scheduler 22 and sorts the values from the highest fractional portion values to lowest fractional portion values. In this example, scheduler 22(1)=1.33, scheduler 22(2)=1.33, and scheduler 22(3)=1.33. Resource manager 18 then moves the fractional portion of the value with the lowest fractional portion value to the value with the highest fractional portion value so that scheduler 22(1)=1.66, scheduler 22(2)=1.33, and scheduler 22(3)=1.00. Resource manager 18 next moves the fractional portion of the value with the next lowest fractional portion value to the value with the highest fractional portion value so that scheduler 22(1)=2.00, scheduler 22(2)=1.00, and scheduler 22(3)=1.00. From this determination, resource manager 18 provides two of the resources to scheduler 22(1), one resource to scheduler 22(2), and one resource to scheduler 22(3).

If amount of resources provided to scheduler 22 is at least equal to the minimum amount of resources 44B specified by the scheduler 22 after reallocating resources among the same priority schedulers 22 as indicated in a block 57, then the request is satisfied and resource manager 18 completes the initial allocation of resources for scheduler 22. If the request is not satisfied after reallocating resources among the same priority schedulers 22 as indicated in block 57, then resource manager 18 attempts to satisfy the remainder of the request using resources from higher priority schedulers 22 (i.e., schedulers 22 with a priority 44A that is higher than the priority 44A of the newly created scheduler 22) in process 12. Resource manager 18 removes any resources from the higher priority schedulers 22 that are above the minimum amount of resources 44B of each of the higher priority schedulers 22 and reallocates these resources to the newly created scheduler 22 as indicated in a block 58.

If the request is still not satisfied after reallocating resources among all of the schedulers 22 in process 12, then resource manager 18 oversubcribes (i.e., shares) resources among multiple schedulers 22 beginning with the schedulers 22 with the lowest priorities 44A until the request is satisfied. Resources may be shared by two or more lower priority schedulers 22 until sufficient resources become available to satisfy the request of the newly created scheduler 22.

Resource manager 18 may provide processing, execution context, memory, and/or network resources to a scheduler 22 using the embodiment of FIG. 3. Resource manager 18 may perform the method of FIG. 3 separately for each type of resource managed by resource manager 18.

For processing resources, resource manager 18 provides the processing resources by providing an array of interfaces to virtual processor roots 19 and a count of the number of array elements to the scheduler 22. The interfaces include information about the topology of the hardware threads 16 corresponding to the virtual processor roots 19.

Scheduler 22 creates a virtual processor 32 for each interface to a virtual processor root 19 and maps each virtual processor 32 to a corresponding virtual processor root 19. Scheduler 22 activates each virtual processor 32 by causing a thread proxy 20 to be initiated on a corresponding virtual processor root 19 and specifying an execution context 34 for execution. Once initiated, each thread proxy 20 dispatches the execution context 34 specified by the scheduler 22 to begin execution of the execution context 34. Subsequent to each initial execution context 34 being dispatched, virtual processors 32 execute tasks as described above until no tasks are found to execute, until being removed from scheduler 22, or until scheduler 22 shuts down.

Resource manager 18 periodically or continuously monitors the amount of use of resources by each scheduler 22 by receiving feedback from schedulers 22. Based on the feedback, the available resources, and the policies 44 of schedulers 22, resource manager 18 periodically or continuously reallocates resources between schedulers 22 to attempt to optimize the overall allocation of resources. Resource manager 18 reallocates the resources by removing resources from and/or add processing resources to one or more schedulers 22 or by temporarily sharing idle resources among two or more schedulers 22.

FIG. 4 is a block diagram illustrating an embodiment of scheduler proxies 62(1)-62(P) that correspond to respective schedulers 22(1)-22(P) in resource manager 18. Scheduler proxies 62(1)-62(P) include respective hill climbing instances 64(1)-64(P). Scheduler proxies 62(1)-62(P) request feedback from corresponding schedulers 22(1)-22(P), and hill climbing instances 64(1)-64(P) process the feedback to determine whether resource allocation changes are desirable. Each hill climbing instance 64 implements a hill climbing algorithm that iteratively adjusts the resource allocation to attempt to achieve an optimal resource allocation for a scheduler 22.

Figure 5A:
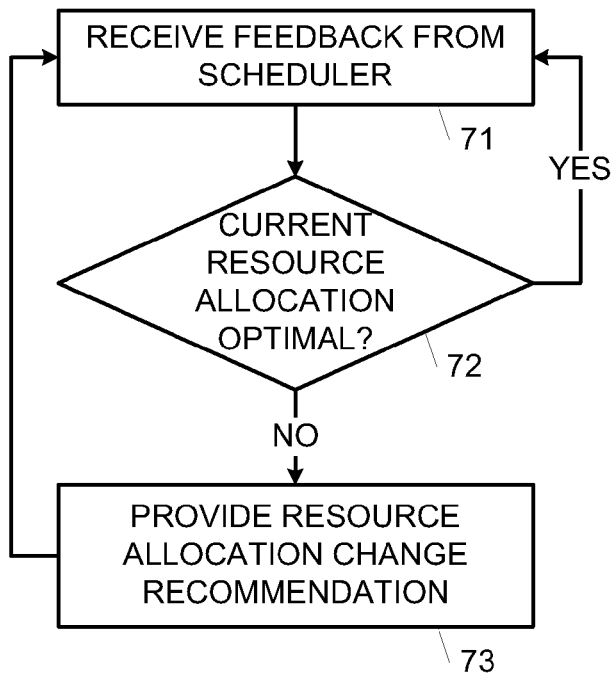
FIG. 5A is a flow chart illustrating an embodiment of a method performed by a scheduler proxy.

FIG. 5A is a flow chart illustrating an embodiment of a method that is independently performed by each scheduler proxy 62. Scheduler proxy 62 receives feedback from a scheduler 22 as indicated in a block 71. Scheduler proxy 62 periodically or continuously provides requests for statistics to scheduler 22. Scheduler 22 generates and maintains statistics that may be used to determine an amount of use of resources by the scheduler 22. Scheduler 22 provides these statistics to scheduler proxy 62 in response to receiving the request for statistics.

In one embodiment, the statistics includes the number of tasks that have arrived in scheduler 22 since the last request for statistics, the number of tasks that have been completed by scheduler 22 since the last request for statistics, and a total number of uncompleted tasks in scheduler 22. Each virtual processor 32 maintains a current arrived count and a current completed count to track the numbers of tasks that arrive and complete on each virtual processor 32. Each virtual processor 32 also stores the current arrived count as a previous arrived count and the current completed count as a previous completed after each request for statistics. Each virtual processor 32 may store the counts in virtual processor local storage that is writeable only by a corresponding virtual processor and maintain the counts without resetting any of the counts in respond to the requests. If a virtual processor 32 is removed from scheduler 22, scheduler 22 stores the counts from the removed virtual processor 32 and includes the stored counts in the statistical information gathered in response to the next request from resource manager 18.

Scheduler 22 accesses the counts from each virtual processor 32. Scheduler 22 generates the number of tasks that have arrived in scheduler 22 since the last request for statistics as a sum of all of the current arrived counts minus a sum of all of the previous arrived counts. Scheduler 22 generates the number of tasks that have been completed by scheduler 22 since the last request for statistics as a sum of all of the current completed counts minus a sum of all of the previous completed counts. Scheduler 22 generates the total number of uncompleted tasks in scheduler 22 as a sum of all of the current arrived counts minus a sum of all of the current completed counts.

In some embodiments, scheduler 22 may allow external execution contexts from process 12 to be inducted into scheduler 22 to execute tasks of the scheduler 22. In these embodiments, each external execution context also stores current arrived and current completed counts and previous arrived and previous completed counts in thread local storage (not shown) similar to the way each virtual processor 32 stored the counts in virtual processor local storage as described above. For each request for statistics, scheduler 22 reads the current arrived and current completed counts and previous arrived and previous completed counts from the thread local storage of each external count and includes these counts into the generated statistics.

External execution contexts may exit the scheduler 22 at any time. When external execution contexts exit the scheduler 22, the exiting external execution contexts store corresponding indicators with the corresponding counts in the thread local storages. Each indicator indicates that a corresponding external execution context has exited the scheduler 22. On each request for statistics, scheduler 22 detects any indicators that indicate that an external execution context has exited the scheduler 22 and deletes the counts of all external execution contexts that exited the scheduler 22 after reading the counts and including the counts in the generated statistics.

In other embodiments, each scheduler 22 may use other statistics to track the amount of use of the processing or other resources of scheduler 22 and/or may provide other types of statistical information that describes the amount of use of the processing or other resources to scheduler proxy 62.

In addition, OS 14 and/or resource manager 18 may generate statistics that are accessed by scheduler proxy in addition to those generated by scheduler 22. For example, OS 14, resource manager 18 and/or scheduler 22 may track a number of execution contexts allocated to a scheduler 22, an amount of memory allocated to process 12 and/or each scheduler 22 in process 12, and/or an amount of network bandwidth used by process 12 and/or each scheduler 22 in process 12.

After receiving the feedback from scheduler 22, scheduler proxy 62 provides the statistics to hill climbing instance 64 to determine whether the current resource allocation is optimal as indicated in a block 72. Hill climbing instance 64 processes the statistics to determine an amount of use of resources by the scheduler 22. Hill climbing instance 64 implements a convex optimization algorithm to process the statistics. In one embodiment, the convex optimization algorithm involves determining a rate of change of uncompleted tasks of scheduler 22. In particular, hill climbing instance 64 computes a slope of the tangent line that includes the current and previous amounts of uncompleted tasks (i.e., simple derivative approximation) based on the previous and current resource allocations, and determines whether the current resource allocation is optimal based on the slope. Additional techniques for this embodiment may be found in U.S. patent application Ser. No. 12/243,859, filed on Oct. 1, 2008, and entitled MANAGING POOLS OF DYNAMIC RESOURCES which is incorporated by reference herein. In other embodiments, hill climbing instance 64 implements other convex optimization algorithms and/or uses other suitable statistics to determine whether the current resource allocation is optimal.

Hill climbing instance 64 determines whether the current resource allocation is optimal by detecting whether scheduler 22 may benefit from additional resources or may have unused or under used resources. If the current resource allocation is not optimal, scheduler proxy 62 provides a resource allocation change recommendation to resource manager 18 as indicated in a block 73. The resource allocation change recommendation may recommend an increase of one or more resources or a decrease of one or more resources. If and when resource manager 18 decides to change the current allocation for scheduler 22, scheduler proxy 62 notifies hill climbing instance 64 to update the current allocation and compute the slope based on the updated parameters. After making a recommendation, scheduler proxy 62 continues the process of receiving feedback from scheduler 22 and providing recommendations to resource manager 18.

In the above embodiment, resource manager 18 may adjust the time between feedback requests to determine how quickly to adjust resource allocations. By decreasing the time between feedback requests, resource manager 18 may adjust resource allocations more quickly to adapt to changing conditions. By increasing the time between feedback requests, resource manager 18 may adjust resource allocations more slowly to increase statistical confidence in the feedback used to determine the resource allocations.

Scheduler proxy 62 may gather statistics for processing, execution context, memory, and/or network resources from scheduler 22 using the embodiment of FIG. 5A. Scheduler proxy 62 may perform the method of FIG. 5A separately for each type of resource managed by resource manager 18.

Figure 5B:
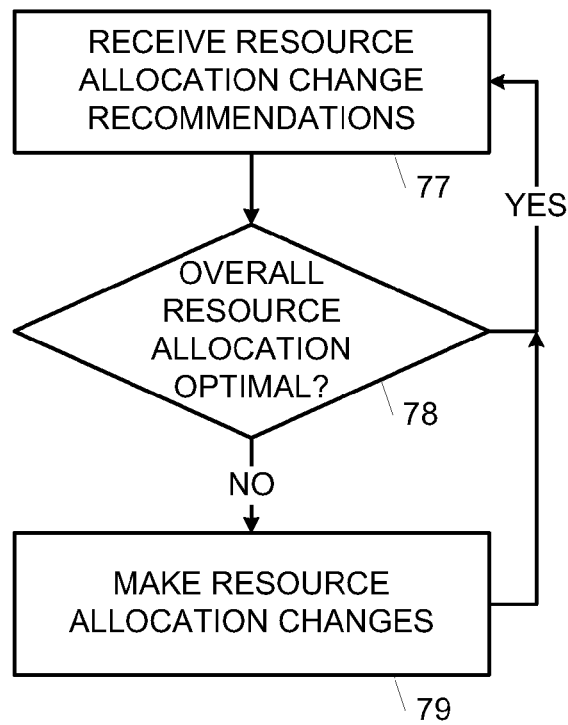
FIG. 5B is a flow chart illustrating an embodiment of a method for dynamically allocating resources to a scheduler.

FIG. 5B is a flow chart illustrating an embodiment of a method for dynamically allocating resources to scheduler 22 by resource manager 18. Resource manager 18 receives the resource allocation change recommendations from each scheduler proxy 62 as indicated in a block 77.

Resource manager 18 determines whether the overall resource allocation across all schedulers 22 is optimal as indicated in a block 78. To do so, resource manager 18 analyzes the resource allocation change recommendations in view of the available resources (if any), the policies of schedulers 22, and the topology of the underlying computer system.

Resource manager 18 first ensures that all schedulers 22 have at least an amount of resources equal to the minimum amount of resources 44B specified by each scheduler 22. As described above, one or more resources may be shared by two or more schedulers 22. After schedulers 22 have at least an amount of resources equal to the minimum amounts of resources 44B, resource manager 18 determines whether the allocation of the remaining resources is optimal.

Resource manager 18 considers whether resources may be reallocated between schedulers 22 to optimize the resource allocation. Resource manager 18 identifies schedulers 22 with idle or under used resources and/or schedulers 22 that have one or more resources above the minimum amount of resources 44B of that scheduler 22 as possible sources for resource reallocation. Resource manager 18 also identifies schedulers 22 that request additional resources and that do not have a maximum amount of resources 44C specified by that scheduler 22 as possible destinations for resource reallocation.

Given the possible sources and targets for resource reallocation, resource manager considers the priorities 44A of the possible source and destination schedulers 22 and the topology of the computer system in determining the schedulers 22 where resources are to be removed and the schedulers 22 where resources are to be added. Resource manager 18 attempts to remove resources from schedulers 22 with lower priorities and add resources to schedulers 22 with higher priorities. In addition, resource manager 18, for each scheduler 22, attempts to remove resources from a scheduler 22 that have less locality to the other resources in the scheduler 22 and add resources to a scheduler 22 that have more locality to the other resources in the scheduler 22. By doing so, resource manager 18 may group resources in schedulers 22 with the same locality characteristics such as the same processor package or the same NUMA node.

If resource manager 18 determines that the overall resource allocation may be improved (i.e., the overall resource allocation is not optimal), then resource manager 18 makes resource allocation changes as indicated in a block 79 by removing resources from schedulers 22, adding resources to schedulers 22, and/or sharing resources that are idle in schedulers 22 that have only the minimum number of resources. For any resource that was idle in a given scheduler 22 and was subsequently shared with another scheduler, resource manager 18 returns the resource to the given scheduler 22 for exclusive use if the given scheduler 22 if the resource becomes non-idle in the given scheduler 22. Resource manager 18 notifies the scheduler proxies 62 of the removals, additions and/or sharings to cause the resources to be removed, added, and/or shared.

Resource manager 18 may reallocate processing, execution context, memory, and/or network resources to schedulers 22 using the embodiment of FIG. 5B. Resource manager 18 may perform the method of FIG. 5B separately for each type of resource managed by resource manager 18.

For processing resources, resource manager 18 provides an array of interfaces to virtual processor roots 19 and a count of the number of array elements to the scheduler 22 to add processing resources as described above. Scheduler 22 creates a virtual processor 32 for each interface to a virtual processor root 19, maps each virtual processor 32 to a corresponding virtual processor root 19, and activates each virtual processor 32 as described above.

Resource manager 18 removes processing resources from a scheduler 22 by providing an array of interfaces to virtual processor roots 19 that are to be removed and a count of the number of array elements to the scheduler 22. Scheduler 22 causes execution contexts 34 that are executing on the virtual processors 32 that correspond to the virtual processor roots 19 that are to be removed to exit and removes the virtual processors 32. The execution contexts 34 that exited may block and resume execution on other virtual processors 32 in scheduler 22. Resource manager 18 may reallocate the removed processing resources to other schedulers 22.

In the above embodiments, a scheduler 22 may shut down at any time. If a scheduler 22 shut downs, resource manager 18 reclaims all resources allocated to the scheduler 22 and may reallocate the resources to other schedulers 22 using the methods described above.

Figure 6:
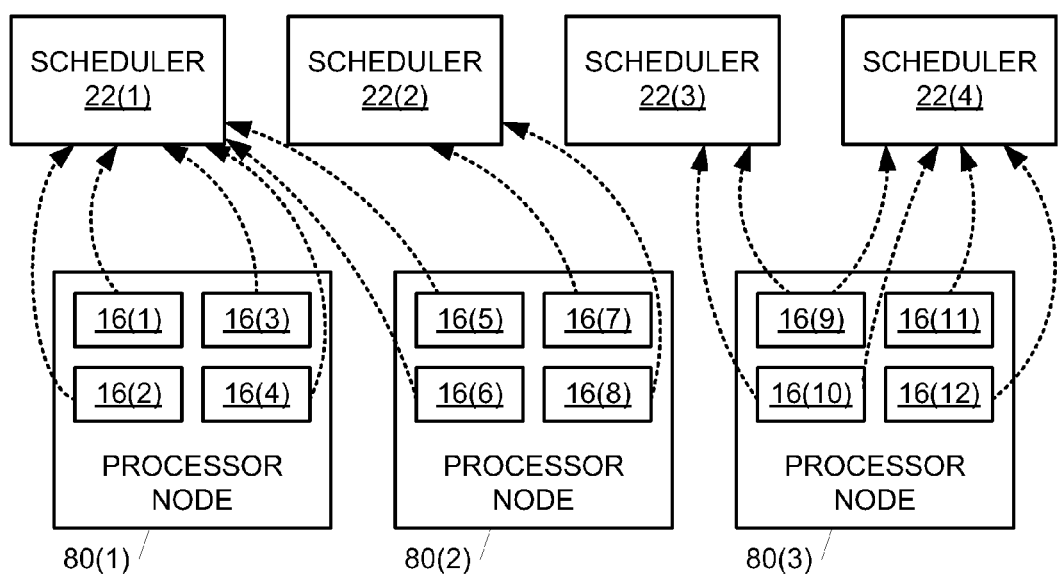
FIG. 6 is a block diagram illustrating an example of dynamically allocating resources to schedulers.

FIG. 6 is a block diagram illustrating an example of dynamically allocating resources to schedulers 22. In the example of FIG. 6, a processing node 80(1) includes hardware threads 16(1)-16(4), a processing node 80(2) includes hardware threads 16(5)-16(8), and a processing node 80(3) includes hardware threads 16(9)-16(12). As indicated by the arrows, hardware threads 16(1)-16(6) are allocated to scheduler 22(1), hardware threads 16(7)-16(8) are allocated to scheduler 22(2), hardware threads 16(9)-16(10) are allocated to (i.e., shared by) schedulers 22(3) and 22(4), and hardware threads 16(11)-16(12) are allocated to scheduler 22(4).

If schedulers 22(2) and 22(4) shut down, resource manager 18 reclaims hardware threads 16(7), 16(8), 16(11), and 16(12). Resource manager 18 may reallocate hardware threads 16(7), 16(8), 16(11), and 16(12) to schedulers 22(1) and 22(3).

If schedulers 22(1) and 22(3) have the same priority 44A and the same proportionate demand for processing resources as determined from the minimum and maximum amounts of processing resources 44B and 44C, then resource manager 18 may allocate two of hardware threads 16(7), 16(8), 16(11), and 16(12) to scheduler 22(1) and two of hardware threads 16(7), 16(8), 16(11), and 16(12) to scheduler 22(3). Hardware threads 16(7) and 16(8) are in the same node 80(2) as hardware threads 16(5) and 16(6) that are allocated to scheduler 22(1), and hardware threads 16(11) and 16(12) are in the same node 80(3) as hardware threads 16(9) and 16(10) that are allocated to scheduler 22(3). Accordingly, resource manager 18 allocates hardware threads 16(7) and 16(8) to scheduler 22(1) and hardware threads 16(11) and 16(12) to scheduler 22(3).

If scheduler 22(1) has a higher priorities 44A than scheduler 22(3) and scheduler 22(1) could use four additional resources, then resource manager 18 allocates all four hardware threads 16(7), 16(8), 16(11), and 16(12) to scheduler 22(1).

Figure 7A:
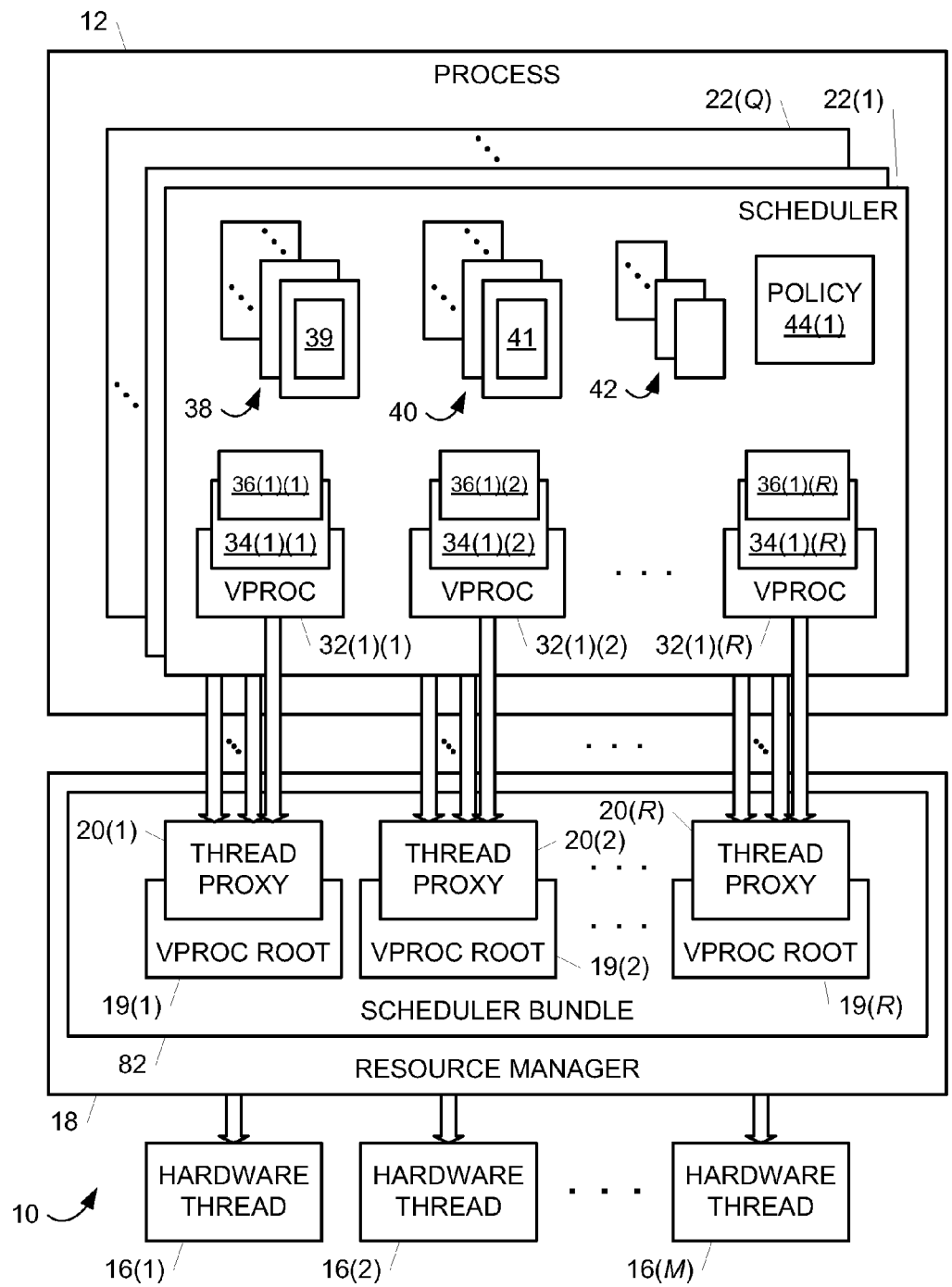
FIGS. 7A-7B are block diagrams illustrating embodiments of a scheduler bundle in a runtime environment.
Figure 7B:
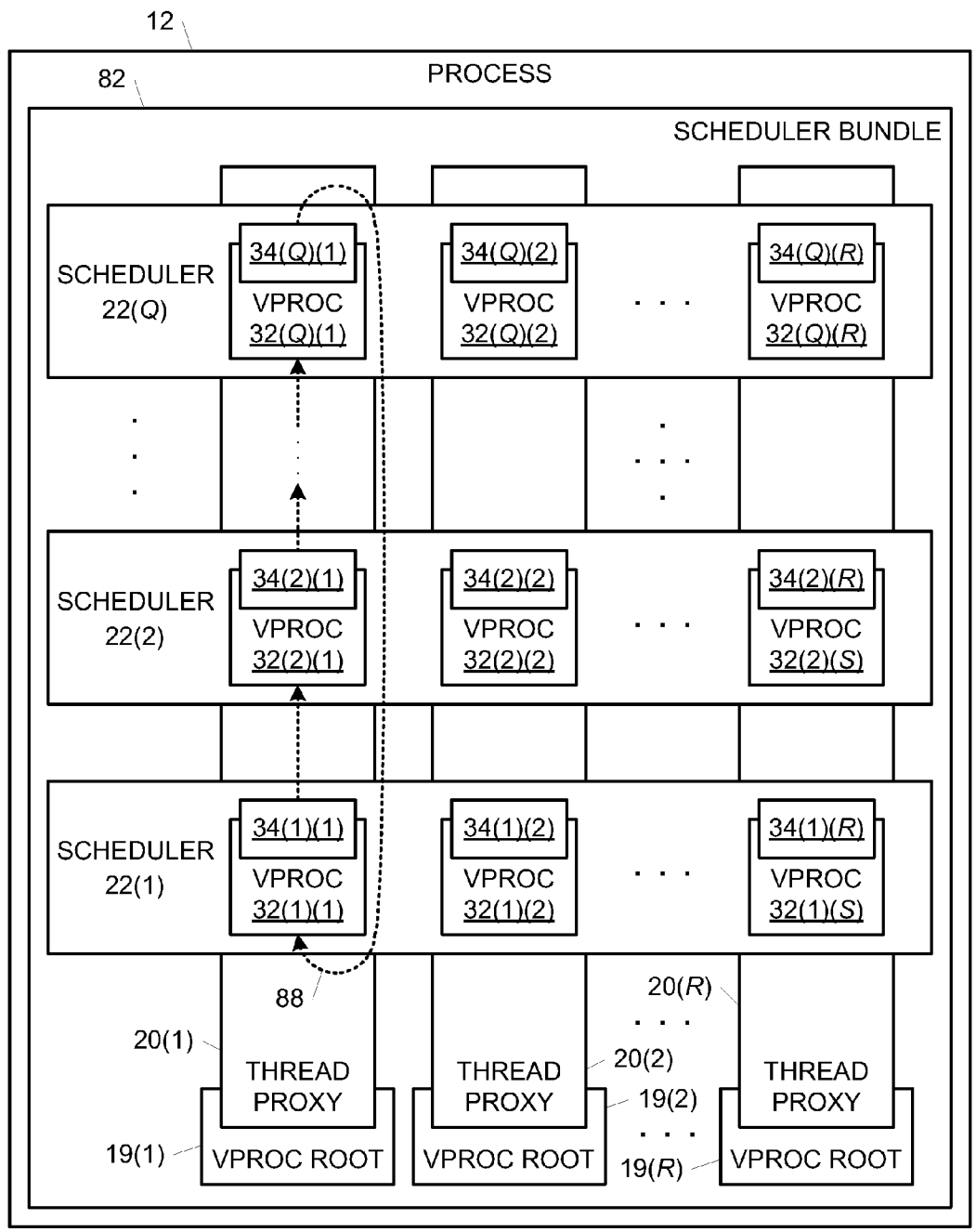

Any set or subset of schedulers 22 in process 12 may be configured into one or more scheduler bundles 82 in resource manager 18 as shown in the embodiments of FIGS. 7A-7B. FIGS. 7A-7B are block diagrams illustrating embodiments of a scheduler bundle 82 with virtual processor roots 19(1)-19(R) and thread proxies 20(1)-20(R) in runtime environment 10 where R is an integer that is greater than or equal to one. In the embodiments of FIGS. 7A-7B, each thread proxy 20 provides quanta of execution of a corresponding virtual processor root 19 to execution contexts 34 on corresponding virtual processors 32 across a set of schedulers 22(1)-22(Q) of the scheduler bundle 82, where Q is an integer that is greater than or equal to one.

In the embodiment of FIGS. 7A-7B, runtime environment 10 includes a scheduler bundle function that generates scheduler bundle 82 with virtual processor roots 19 and thread proxies 20 in addition to the scheduler function that generates schedulers 22 for inclusion in scheduler bundle 82. In one embodiment, the scheduler bundle function is implemented as an application programming interface (API). In other embodiments, the scheduler bundle function may be implemented using other suitable programming constructs. When invoked, the scheduler bundle function creates scheduler bundle 82 to manage one or more schedulers 22 in scheduler bundle 82. The scheduler function creates a scheduler 22 in scheduler bundle 82, where each scheduler 22 operates to schedule execution contexts of process 12 for execution on virtual processors 32 of the scheduler 22. The execution contexts execute on thread proxies 20 which in turn execute on execution contexts on hardware threads 16.

Resource manager 18 includes the scheduler bundle function in one embodiment and thus, creates and manages scheduler bundle 82, a set of virtual processor roots 19(1)-19(R), where each virtual processor root 19 manages a corresponding set of virtual processors 32 across the schedulers 22 in scheduler bundle 82, and a set of thread proxies 20(1)-20(R), where each thread proxy 20 executes a corresponding set of scheduler execution contexts across the schedulers 22 in scheduler bundle 82 on a corresponding virtual processor root 19. Resource manager 18 causes thread proxies 20(1)-20(R) on corresponding virtual processor roots 19(1)-19(R) to be executed on underlying execution contexts obtained from the OS on hardware threads 16.

Process 12 implicitly or explicitly causes scheduler bundle 82, virtual processor roots 19(1)-20(R), thread proxies 20(1)-21(R), and schedulers 22(1)-22(Q) to be created via the corresponding functions provided by runtime environment 10 and/or resource manager 18. Scheduler bundle 82, virtual processor roots 19, thread proxies 20, and schedulers 22 may be implicitly created when process 12 uses APIs available in the computer system or programming language features. In response to the API or programming language features, runtime environment 10 creates scheduler bundle 82, virtual processor roots 19, thread proxies 20, and schedulers 22 that inherit the policies of scheduler bundle 82. To explicitly create scheduler bundle 82, virtual processor roots 19, thread proxies 20, and schedulers 22, process 12 may invoke the scheduler bundle and scheduler functions provided by runtime environment 10 and specify one or more policies for scheduler bundle 82, virtual processor roots 19, thread proxies 20, and schedulers 22.

Scheduler bundle 82 manages virtual processor roots 19 and corresponding thread proxies 20 to share virtual processor roots 19 and thread proxies 20 among all schedulers 22(1)-22(Q) in scheduler bundle 82. Scheduler bundle 82 may share virtual processor roots 19 and thread proxies 20 among schedulers 22(1)-22(Q) cooperatively, preemptively, or with another suitable type of time slicing. As part of creating scheduler bundle 82, resource manager 18 allocates virtual processor roots 19 and thread proxies 20 to scheduler bundle 82 based on supply and demand and any policies of scheduler bundle 82. In one embodiment, scheduler bundle 82 creates each scheduler 22(1)-22(Q). In other embodiments, one or more of scheduler 22(1)-22(Q) that are external to scheduler bundle 82 may invoke a programming API or other suitable programming construct to attach to scheduler bundle 82.

In one embodiment, process 12 adds each scheduler 22(1)-22(Q) to scheduler bundle 82 with the same set of scheduler policies. In another embodiment, process 12 adds each scheduler 22(1)-22(Q) to scheduler bundle 82 with a different set of scheduler policies. Each scheduler 22 receives virtual processors 32(1)-32(R) where each virtual processor 32 forms an abstraction of underlying virtual processor roots 19 and hardware threads 16. Each scheduler 22 also receives information that maps virtual processors 32(1)-32(R) of a scheduler 22 to corresponding virtual processor roots 19(1)-20(R). As shown in FIG. 7B, virtual processors 32(1)(1)-32(Q)(1) from respective schedulers 22(1)-22(Q) map to virtual processor root 19(1), virtual processors 32(1)(2)-32(Q)(2) from respective schedulers 22(1)-22(Q) map to virtual processor root 19(2), and so on.

Scheduler bundle 82 dispatches the execution contexts 34 on thread proxies 20 and schedules thread proxies 20 on virtual processor roots 19 which execute on execution contexts associated with hardware threads 16. Each thread proxy 20 switches between execution of execution contexts 34 on virtual processors 32 on the corresponding virtual processor root 19. Each thread proxy 20 causes a single execution context 34 to be executed at any given time but periodically performs context switches between execution of execution contexts 34 to execute each of the set of execution contexts 34 on virtual processors 32 that correspond to the virtual processor root 19 of the thread proxy 20. Each thread proxy 20 provides a quantum of execution upon dispatching an execution context 34 of a scheduler 22. The quantum of execution may be expressed in time (e.g., 50 ms), by a number of tasks to be executed, or by any other suitable metric. The quantum of execution may be the same or different for each dispatched execution context 34.

As shown in FIG. 7B, thread proxy 20(1) switches between execution of execution contexts 34(1)(1)-34(Q)(1) from respective schedulers 22(1)-22(Q), thread proxy 20(2) switches between execution of execution contexts 34(1)(2)-34(Q)(2) from respective schedulers 22(1)-22(Q), and so on. As shown by an arrow 88, for example, thread proxy 20(1) dispatches execution context 34(1)(1) for a quantum of execution on virtual processor root 19(1) and, once execution context 34(1)(1) detects that quantum has expired and yields back to thread proxy 20(1), thread proxy 20(1) dispatches execution context 34(2)(1) for a quantum of execution on virtual processor root 19(1). Thread proxy 20(1) continues the process of dispatching a next one of the set of execution contexts 34(1)(1)-34(Q)(1) each time a current one of the set of execution context 34(1)(1)-34(Q)(1) yields back to thread proxy 20(1). Referring back to FIG. 7A, scheduler 22 executes execution contexts 34 on virtual processors 32 which are, in turn, executed by thread proxies 20 on virtual processor roots 19.

The process of allocating resources to scheduler bundles 82 using resource manager 18 will now be described.

Resource manager 18 establishes an initial allocation of resources for scheduler bundles 82 as described above with reference to FIGS. 2 and 3 using policies 44 of scheduler bundles 82, the number of resources available for allocation, and an optimal distribution technique. Resource manager 18, however, makes the initial allocation of resources in response to a scheduler bundle being created in block 50 of FIG. 2 rather than in response to an individual scheduler 22 being created in the scheduler bundle 50. In addition, resource manager 18 may satisfy the request for the initial allocation of resources using resources allocated to schedulers 22 not included in a scheduler bundle 82 and resources allocated to other scheduler bundles 82 in blocks 54, 56, and 58 of FIG. 2.

After determining the initial allocation of resources to provide to a scheduler bundle 82, resource manager 18 adds the resources to the scheduler bundle 82. A scheduler 22 registers with the scheduler bundle 82 to add itself to the scheduler bundle 82. For each added scheduler 22, scheduler bundle 82 provides processing resources in the form of an array of interfaces to virtual processor roots 19 and a count of the number of array elements to the scheduler 22 along with other resources. The interfaces include information about the topology of the hardware threads 16 corresponding to the virtual processor roots 19. Scheduler 22 creates a virtual processor 32 for each interface to a virtual processor root 19 and maps each virtual processor 32 to a corresponding virtual processor root 19. Scheduler 22 activates each virtual processor 32 by calling a thread proxy 20 on a corresponding virtual processor root 19 and specifying an execution context 34 for execution. Each thread proxy 20 dispatches the execution context 34 specified by the scheduler 22 when the quantum for the scheduler 22 on the corresponding virtual processing root 19 occurs to begin execution of the execution context 34. Subsequent to each initial execution context 34 being dispatched, virtual processors 32 execute tasks during the quanta provided by scheduler bundle 82 as described above until no tasks are found to execute, until being removed from scheduler 22, or until scheduler 22 shuts down.

Resource manager 18 periodically or continuously monitors the amount of use of resources by each scheduler bundle 82 by receiving feedback from scheduler bundles 82. Based on the feedback, the available resources, and the policies 44 of scheduler bundles 82, resource manager 18 periodically or continuously reallocates resources between scheduler bundles 82 and/or schedulers 22 not in a scheduler bundle 82 to attempt to optimize the overall allocation of resources. Resource manager 18 reallocates the resources by removing resources from and/or add processing resources to one or more scheduler bundles 82 and/or schedulers 22 not in a scheduler bundle 82.

Figure 8:
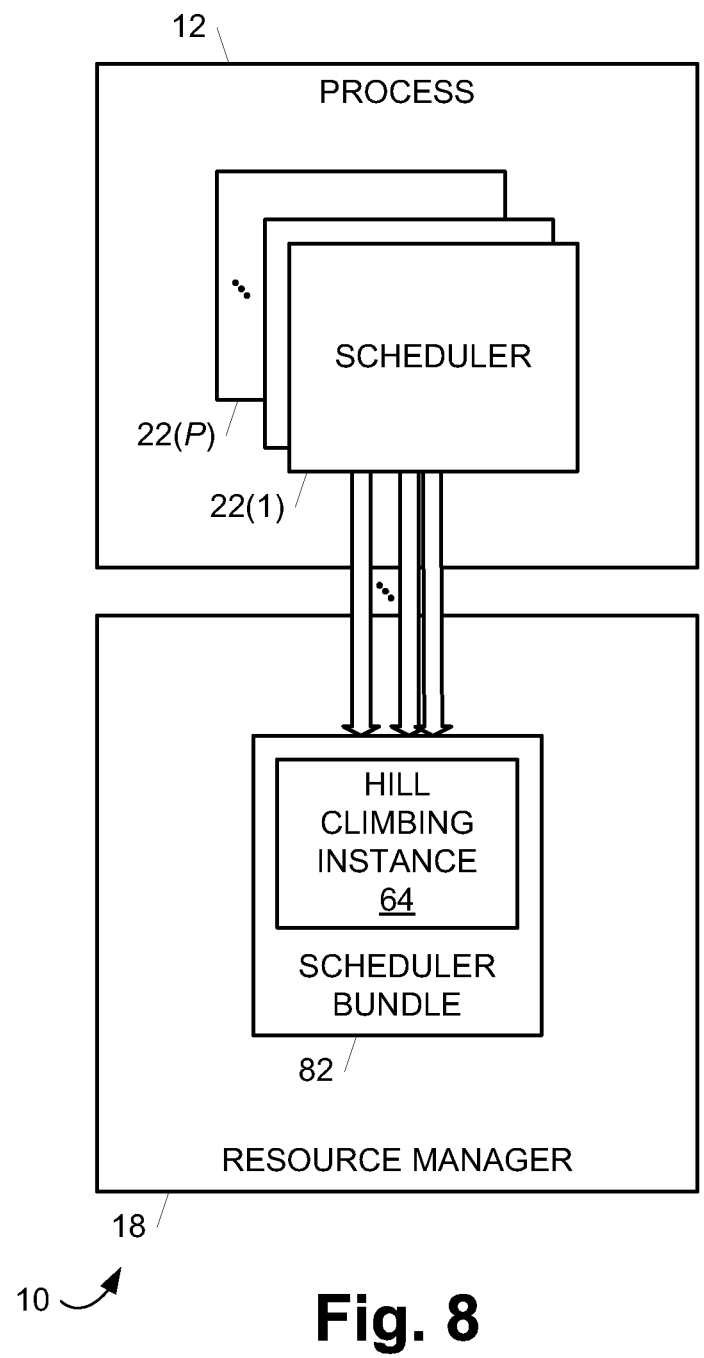
FIG. 8 is a block diagram illustrating an embodiment of a scheduler bundle in a resource manager.

As shown in FIG. 8, each scheduler bundle 82 includes a hill climbing instance 64 that corresponds to each of the schedulers 22 in the scheduler bundle 82. Scheduler bundle 82 performs the functions of scheduler proxy 62 described above with reference to FIG. 5A. In addition, hill climbing instance 64 operates as described above with reference to FIG. 5A except that hill climbing instance 64 receives feedback from all of the schedulers 22 in the scheduler bundle 82, determines optimal resource allocations based on the feedback from all of the schedulers 22 in the scheduler bundle 82, and applies any resource allocation changes to all of the schedulers 22 in the scheduler bundle 82.

Resource manager 18 operates as described above with reference to FIG. 5B except that resource manager 18 receives resource allocation change recommendations from each scheduler bundle 82 and each scheduler proxy 62 and adds resources to or removes resources from scheduler bundles 82 in addition to adds resources to or removes resources from individual schedulers 22.

For processing resources, resource manager 18 adds processing resources to each scheduler 22 of the scheduler bundle 82 by providing an array of interfaces to virtual processor roots 19 and a count of the number of array elements to each scheduler 22. Each scheduler 22 creates a virtual processor 32 for each interface to a virtual processor root 19, maps each virtual processor 32 to a corresponding virtual processor root 19, and activates each virtual processor 32 as described above.

Resource manager 18 removes processing resources from each scheduler 22 of the scheduler bundle 82 by providing an array of interfaces to virtual processor roots 19 that are to be removed and a count of the number of array elements to each scheduler 22. Each scheduler 22 causes execution contexts 34 that are executing on the virtual processors 32 that correspond to the virtual processor roots 19 that are to be removed to exit and removes the virtual processors 32. The execution contexts 34 that exited may block and resume execution on other virtual processors 32 in scheduler 22.

In the above embodiments, each scheduler 22 may operate as a cooperative scheduler where process 12 and other processes are associated with virtual processors 32 in a controlled way. In other embodiments, each scheduler 22 may operate as another type of scheduler such as a preemptive scheduler.

In one embodiment, process 12 (shown in FIGS. 1 and 7A) organizes tasks into one or more schedule groups 90 (shown in FIG. 9) and presents schedule groups 90 to scheduler 22 as shown in FIG. 9. In other embodiments, process 12 organizes tasks into collections for each virtual processor 32 of scheduler 22 in other suitable ways.

FIG. 9 is a block diagram illustrating an embodiment of a schedule group 90 for use in a scheduler 22. Schedule group 90 includes a runnables collection 92, a realized task collection 93, a work collection 94, and a set of zero or more workstealing queues 96. Runnables collection 92 contains a list of unblocked execution contexts 38. Scheduler 22 adds an execution context 38 to runnables collections 92 when an execution context becomes unblocked. Realized task collection 93 contains a list of realized tasks 39 (e.g., unstarted agents) that may or may not have associated execution contexts 38. Scheduler 22 adds a realized task to realized task collection 93 when a new, unstarted task is presented to scheduler 22 by process 12. Work collection 94 contains a list of workstealing queues 96 as indicated by an arrow 98 and tracks the execution contexts 34 that are executing tasks from the workstealing queues 96. Each workstealing queue 96 includes one or more unrealized tasks 42 with no assigned execution context 34 or 38.

Using the embodiment of FIG. 9, scheduler 22 may first search for unblocked execution contexts 38 in the runnables collection 92 of each schedule group 90 in scheduler 22. Scheduler 22 may then search for realized tasks in the realized task collection 93 of all schedule groups 90 before searching for unrealized tasks in the workstealing queues 96 of the schedule groups 90.

In one embodiment, a virtual processor 32 that becomes available may attempt to locate a runnable execution context 38 in the runnables collection 92 or a realized task 39 in the realized task collection 93 in the schedule group 90 from which the available virtual processor 32 most recently obtained a runnable execution context 38 (i.e., the current schedule group 90). The available virtual processor 32 may then attempt to locate a runnable execution context 38 in the runnables collections 92 or a realized task 39 in the realized task collection 93 in the remaining schedule groups 90 of scheduler 22 in a round-robin or other suitable order. If no runnable execution context 38 is found, then the available virtual processor 32 may then attempt to locate an unrealized task 42 in the workstealing queues 96 of the current schedule group 90 before searching the workstealing queues 96 in the remaining schedule groups 90 in a round-robin or other suitable order.

In other embodiments, schedule groups 90 contain other suitable numbers, types, and/or configurations of task collections.

Figure 10:
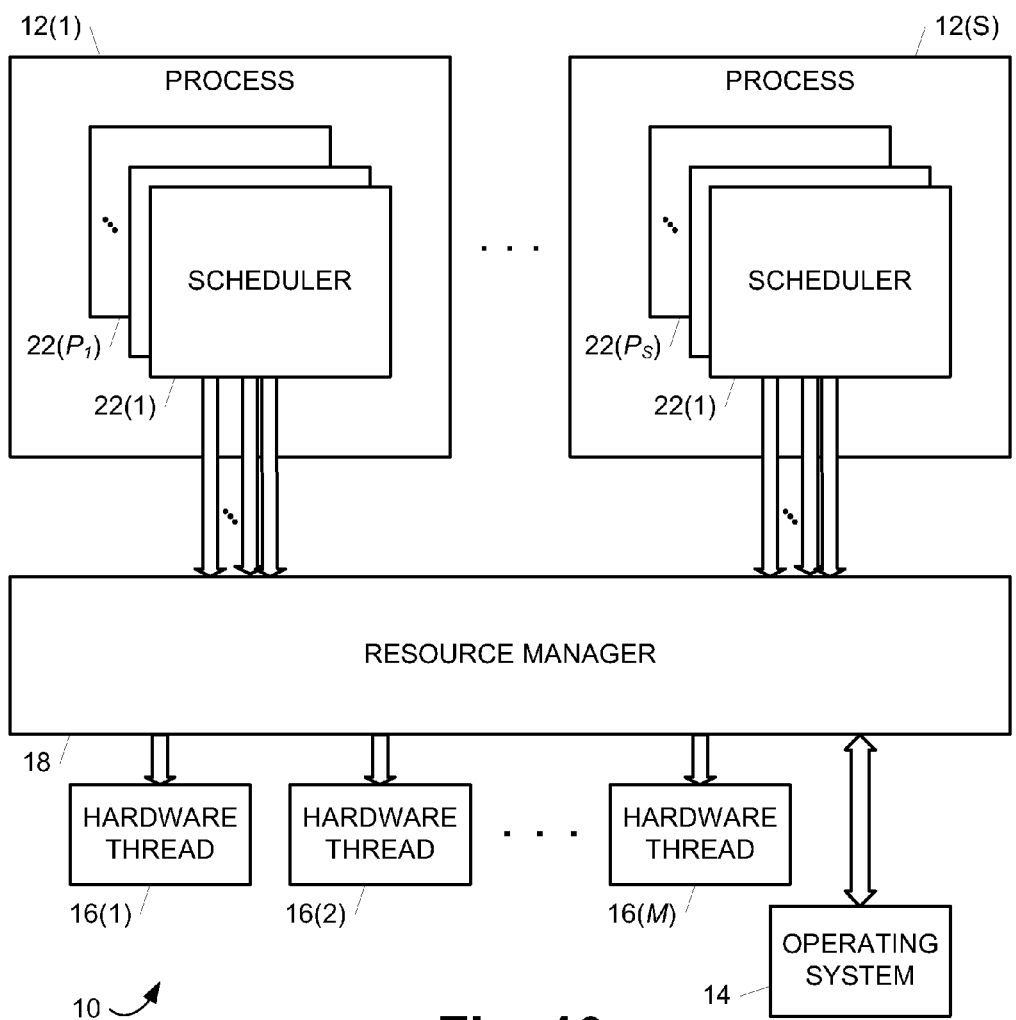
FIG. 10 is a block diagram illustrating an embodiment of a set of processes each with a set of schedulers in a runtime environment.

FIG. 10 is a block diagram illustrating an embodiment of a set of processes 12(1)-12(S), where S is an integer that is greater than or equal to two and denotes the Sth process 12(S), where each process 12 includes a set of schedulers 22 in runtime environment 10.

In addition to initially and dynamically allocating processing resources and other resources between schedulers 22 in a process 12, resource manager 18 may also initially and dynamically allocate processing resources and other resources between schedulers 12 in different processes 12 in the embodiments of FIGS. 1-4 described above. Accordingly, resource manager 18 may initially allocate the processing resources and other resources to each scheduler 22 in each process 12(1)-12(S), monitor the amount of use of the resources by the schedulers 22 in each process 12(1)-12(S), and dynamically adjust the resources of schedulers 22 in each process 12(1)-12(S).

Figure 11:
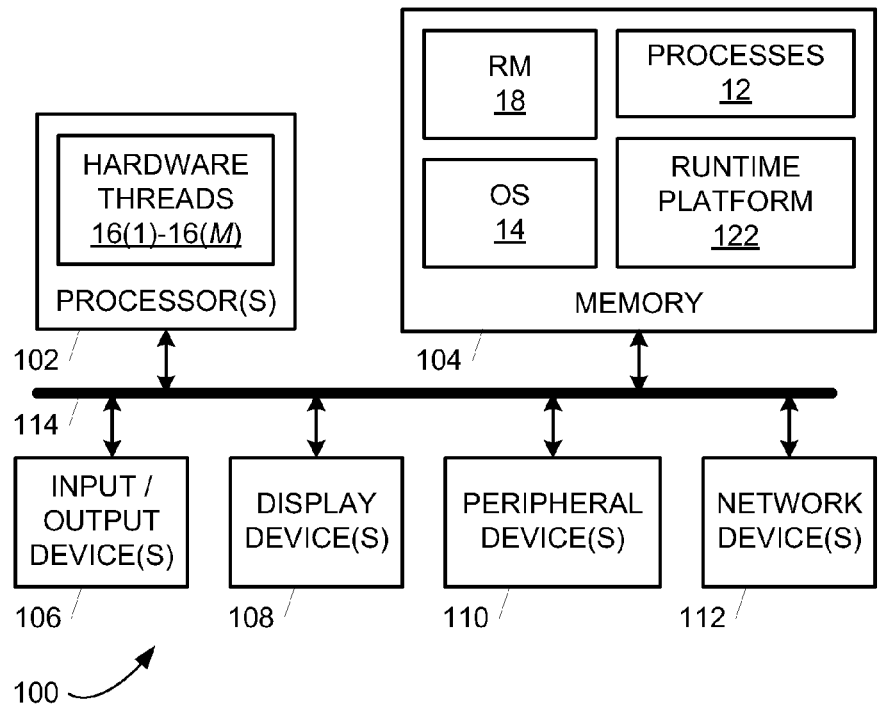
FIG. 11 is a block diagram illustrating an embodiment of a computer system configured to implement a runtime environment that includes a scheduler in a process.

FIG. 11 is a block diagram illustrating an embodiment of computer system 100 which is configured to implement runtime environment 10 including one or more schedulers 22 in one or more processes 12 where each scheduler 22 is configured to schedule execution contexts for execution by processing resources as described above.

Computer system 100 includes one or more processor packages 102, memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 include hardware threads 16(1)-16(M). Each processor package 102 may include hardware threads 16 with the same or different architectures and/or instruction sets. For example, hardware threads 16 may include any combination of in-order execution cores, superscalar execution cores, and GPGPU execution cores. Each hardware thread 16 in processor packages 102 is configured to access and execute instructions stored in memory system 104. The instructions may include a basic input output system (BIOS) or firmware (not shown), processes 12, OS 14 (also shown in FIG. 1), a runtime platform 122, and resource manager 18 (also shown in FIG. 1). Each hardware thread 16 may execute the instructions in conjunction with or in response to information received from input/output devices 106, display devices 108, peripheral devices 110, and/or network devices 112.

Memory system 104 includes any suitable type, number, and configuration of volatile or non-volatile storage devices configured to store instructions and data. The storage devices of memory system 104 represent computer readable storage media that store computer-executable instructions including processes 12, OS 14, resource manager 18, and runtime platform 122. Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. The instructions are executable by computer system 100 to perform the functions and methods of processes 12, OS 14, resource manager 18, and runtime platform 122 described herein. Examples of storage devices in memory system 104 include hard disk drives, random access memory (RAM), read only memory (ROM), flash memory drives and cards, and magnetic and optical disks.

Computer system 100 boots and executes OS 14. OS 14 includes instructions executable by hardware threads 16 to manage the components of computer system 100 and provide a set of functions that allow processes 12 to access and use the components. In one embodiment, OS 14 is the Windows operating system. In other embodiments, OS 14 is another operating system suitable for use with computer system 100.

Resource manager 18 includes instructions that are executable in conjunction with OS 14 to allocate resources of computer system 100 including hardware threads 16 as described above with reference to FIG. 1. Resource manager 18 may be included in computer system 100 as a library of functions available to one or more processes 12 or as an integrated part of OS 14, for example.

Runtime platform 122 includes instructions that are executable in conjunction with OS 14 and resource manager 18 to generate runtime environment 10 and provide runtime functions to processes 12. These runtime functions include a scheduler function as described in additional detail above with reference to FIG. 1. The runtime functions may be included in computer system 100 as part of a process 12, as a library of functions available to one or more processes 12, or as an integrated part of OS 14 and/or resource manager 18.

Each process 12 includes instructions that are executable in conjunction with OS 14, resource manager 18, and/or runtime platform 122 to cause desired operations to be performed by computer system 100. Each process 12 may execute with one or more schedulers 22 as provided by runtime platform 122. The processes 12 may form one or more applications that may be executed by computer system 100.

Input/output devices 106 include any suitable type, number, and configuration of input/output devices configured to input instructions or data from a user to computer system 100 and output instructions or data from computer system 100 to the user. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may operate according to any suitable networking protocol and/or configuration to allow information to be transmitted by computer system 100 to a network or received by computer system 100 from a network.

Figure 12:
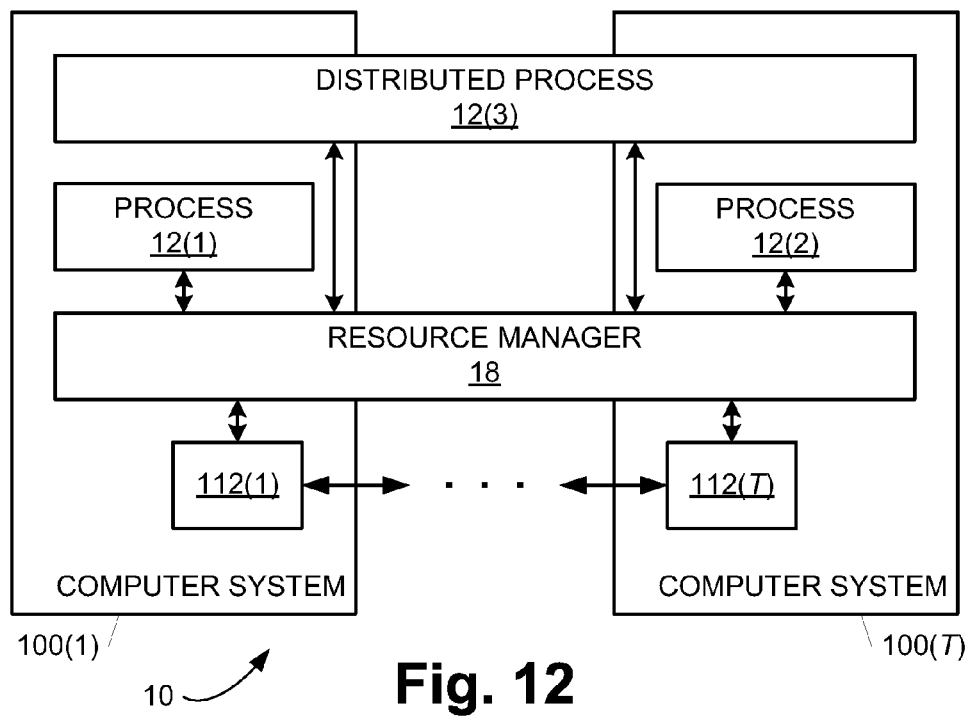
FIG. 12 is a block diagram illustrating an embodiment of a runtime environment that extends across multiple computer systems.

FIG. 12 is a block diagram illustrating an embodiment of a runtime environment 10 that extends across multiple computer systems 100(1)-100(T), where T is an integer that is greater than or equal to two and denotes the Tth computer system 100(T). Computer systems 100(1)-100(T) communicate using any suitable type and number of interconnections between network devices 112(1)-112(T).

FIG. 12 illustrates that the execution of resource manager 18 may extend across any number of computer systems 100(1)-100(T) to dynamically allocate processing and other resources among schedulers 22 in processes 12 executing on or across computer systems 100(1)-100(T). Resource manager 18 may use any suitable proxies or sub-processes to execute across multiple computer systems 100(1)-100(T).

Each process 12 may execute on a single computer system 100 (e.g., processes 12(1) and 12(2)) or across multiple computer systems 100 (e.g., process 12(3)) using any suitable proxies or sub-processes. Accordingly, resource manager 18 may initially allocate processing resources and other resources of computer systems 100(1)-100(T) to each scheduler 22 in each process 12 (e.g., processes 12(1)-12(3)) across computer systems 100(1)-100(T), monitor the amount of use of the resources by the schedulers 22 in each process 12 across computer systems 100(1)-100(T), and dynamically adjust the resources of schedulers 22 in each process 12 across computer systems 100(1)-100(T).

In the above embodiments, resource manager 18 may temporarily provide boosts or other alterations in resource allocations in response to changing execution conditions of runtime environment 10. For example, resource manager 18 may provide OS priority boosts to execution contexts 34 that increase the execution quanta of the execution contexts 34 on hardware threads 16. In addition, resource manager 18 may provide resource allocation boosts for one or more resources to one or more schedulers 22.

As described above, resource manager 18 may determine resource allocations using a static set of policies 44 for each scheduler 22. In other embodiments, a scheduler 22 may be configured to operate using different profiles during different phases of execution. Each of these profiles may include a different set of policies 44 to allow each phase to be provided with optimal resources allocations by hill climbing instance 64 and resource manager 18. In response to a profile change of a scheduler 22 (i.e., a change in policy 44), resource manager 12 may perform dynamically adjust resource allocations across schedulers 22 in the same process 12 and/or different processes 12 and/or computer systems 100 as described above.

In embodiments with different profiles in schedulers 22, the workload of a scheduler 22 may be executed against one or more resource allocation profiles and/or in the presence and/or absence of other workloads to determine optimal profiles for the scheduler 22 using hill climbing instances 64 and resource manager 18. The other workloads may be included in the same process 12 and/or different processes 12 and may be executed on the same computer system 100 and/or different computer systems 100. The optimal profiles may be saved and used as the initial profiles for subsequent executions of the scheduler 22.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer readable storage medium not comprising a propagating signal, the computer readable storage medium storing computer-executable instructions that, when executed by at least one computer system, perform a method comprising:

accessing a first policy of a first scheduler, the first policy being added to a process executing on the at least one computer system, the first policy including a first priority, a minimum limit, and a maximum limit of resources allocable to the first scheduler;

defining an initial allocation of resources to the first scheduler based on the first policy;

determining that the defined initial allocation of resources to the first scheduler based on the first policy results in a fractional allocation of resources to the first scheduler;

responsive to the determination, adjusting the defined initial allocation of resources to the first scheduler to a next higher non-fractional value consistent with the first policy;

providing the adjusted initial allocation of resources to the first scheduler;

receiving statistics from the first scheduler, the statistics including a number of tasks received and a number of tasks completed by the first scheduler during a specified time interval;

processing the received statistics to determine a rate of change of uncompleted tasks of the first scheduler during the specified time interval;

determining, based at least in part on the determined rate of change of uncompleted tasks, if the first scheduler would benefit from allocation of additional resources; and responsive to the determining that the first scheduler would benefit from allocation of additional resources, allocating additional resources to the first scheduler from a set of resources allocated to one or more second schedulers, the set having more resources than a minimum limit of resources allocable to the one or more second schedulers.

2. The computer readable storage medium of claim 1, wherein the initial allocation of resources is greater than or equal to the minimum limit of resources allocable to the first scheduler.

3. The computer readable storage medium of claim 1, wherein the initial allocation of resources is less than or equal to the maximum limit of resources allocable to the first scheduler.

4. The computer readable storage medium of claim 1, the method further comprising: providing at least a portion of the initial allocation of resources from a set of unallocated resources.

5. The computer readable storage medium of claim 1, the method further comprising:

providing at least a portion of the initial allocation of resources from the set of resources allocated to the one or more second schedulers.

6. The computer readable storage medium of claim 1, wherein a second policy specifies a second priority of a second scheduler out of the one or more second schedulers, the first priority being less than the second priority.

7. The computer readable storage medium of claim 1, wherein a second policy specifies a second priority of a second scheduler out of the one or more second schedulers, the first priority being equal to the second priority.

8. The computer readable storage medium of claim 1, wherein a second policy specifies a second priority of a second scheduler out of the one or more second schedulers, the first priority being greater than the second priority.

9. The computer readable storage medium of claim 1, wherein adjusting the defined initial allocation of resources to the first scheduler to the next higher non-fractional value consistent with the first policy comprises:

dividing an available quantity of resources among a quantity of schedulers needing resources, the division resulting in values for each of the quantity of schedulers; and moving a fractional portion of at least one of the values to a value associated with the first scheduler, the resulting value associated with the first scheduler being the next higher non-fractional value.

10. The computer readable storage medium of claim 1, wherein processing the received statistics to determine a rate of change of uncompleted tasks during a specified time interval utilizes a hill climbing instance that implements a convex optimizing algorithm.

11. A method performed by at least one computer system, the method comprising:
   (a) receiving feedback from a first scheduler that has a first allocation of resources in a process executing on the at least one computer system, the feedback comprising a number of tasks received and a number of tasks completed by the first scheduler during a specified time interval;
   (b) implementing a convex optimization algorithm using a hill climbing instance to process the received feedback to compute a slope of a tangent line that represents a rate of change of current and previous uncompleted tasks during the specified time interval based on a current allocation and a previous allocation of resources to the first scheduler;
   (c) determining that an overall resource allocation between the first scheduler and one or more second schedulers, which is based on the computed slope of the tangent line, is not an optimal resource allocation; and
   (d) dynamically changing the first resource allocation of the first scheduler and one or more second resource allocations of the one or more second schedulers in an increasing order of priority of the one or more second schedulers, the one or more second resource allocations being changed until the optimal resource allocation is achieved, wherein dynamically changing the first resource allocation of the first scheduler comprises adding a resource from the one or more second schedulers to the first scheduler.

12. The method of claim 11 further comprising:
   changing the first resource allocation of the first scheduler by removing a resource from the first scheduler.

13. The method of claim 11 further comprising:
   determining a current amount of use of the first resource allocation from the feedback; and
   providing a first resource allocation change recommendation by comparing a current amount of use of the first resource allocation to a previous amount of use of the first resource allocation.

14. The method of claim 11 wherein the first scheduler is included in a scheduler bundle.

15. A computer readable storage medium not comprising a propagating signal, the computer readable storage medium storing computer-executable instructions that, when executed on at least one computer system, perform a method comprising:
   determining an initial allocation of resources for a first scheduler in a process executing on the at least one computer system based on a first policy of the first scheduler, the first policy including a minimum limit and a maximum limit of resources allocable to the first scheduler, the initial allocation of resources being between the minimum limit and the maximum limit of the resources allocable to the first scheduler;
   receiving a first information that describes a current number of uncompleted tasks in the first scheduler, the current number of uncompleted tasks being a sum of newly arrived tasks minus a sum of all completed tasks during a specified time interval;
   determining that a set of second schedulers has one or more idle resources that have same locality characteristics as locality characteristics of the resources initially allocated to the first scheduler; and
   allocating an amount of resources out of the one or more idle resources of the set of second schedulers to the first scheduler, the amount being dependent on the first information and the amount being limited to the maximum limit of resources allocable to the first scheduler, the set of second schedulers having more resources than a minimum limit of resources allocable to the second schedulers.

16. The computer readable storage medium of claim 15, the method further comprising:
   determining that an overall resource allocation between the first scheduler and the set of second schedulers is less than optimal based on the first information, the first policy of the first scheduler, the current allocation of resources of the set of second schedulers, and any policies of the set of second schedulers; and
   changing the initial allocation of resources for the first scheduler in order to optimize the overall resource allocation.

17. The computer readable storage medium of claim 15, the method further comprising:
   committing a change of the initial allocation of resources in response to determining that the change improved the performance of the process; and
   rolling back the change of the initial allocation of resources in response to determining that the change did not improve the performance of the process.

18. The computer readable storage medium of claim 15, the method further comprising:
   comparing the first information to a second information that describes a previous number of uncompleted tasks in the first scheduler; and
   changing the initial allocation of the resources for the first scheduler based on the comparison of the first information to the second information.

19. The computer readable storage medium of claim 15, wherein each resource in the initial allocation of resources includes a respective virtual processor that maps to a respective hardware thread of the at least one computer system.

20. The method of claim 11, wherein at least a portion of the first allocation of resources to the first scheduler is made from a set of unallocated resources.

* * * * *